(12) United States Patent
Takiba et al.

(10) Patent No.: US 7,652,518 B2
(45) Date of Patent: Jan. 26, 2010

(54) BUS SWITCH WITH LEVEL SHIFTING

(75) Inventors: Akira Takiba, Kanagawa-ken (JP);
Masaru Mizuta, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/778,275

(22) Filed: Jul. 16, 2007

(65) Prior Publication Data
US 2008/0028121 A1      Jan. 31, 2008

(30) Foreign Application Priority Data
Jul. 12, 2006   (JP)   ............................. 2006/192140

(51) Int. Cl.
*H03L 5/00*   (2006.01)
(52) U.S. Cl. .................. 327/333; 327/389; 327/391; 327/403; 327/404
(58) Field of Classification Search .............. 327/333, 327/389, 391, 403, 404, 427, 434, 437; 326/68, 326/81, 83
See application file for complete search history.

(56) References Cited
U.S. PATENT DOCUMENTS
5,742,183 A    4/1998   Kuroda

| | | | |
|---|---|---|---|
| 6,320,408 B1 * | 11/2001 | Kwong | ........................ 327/427 |
| 6,559,703 B1 * | 5/2003 | Kwong et al. | ................ 327/389 |
| 6,670,829 B1 * | 12/2003 | Chow | ........................... 326/81 |
| 6,781,415 B2 * | 8/2004 | Clark et al. | ................... 326/81 |
| 6,933,749 B2 | 8/2005 | Takiba et al. | |
| 7,161,386 B2 | 1/2007 | Takiba et al. | |
| 2006/0238219 A1 | 10/2006 | Takiba | |

* cited by examiner

*Primary Examiner*—Long Nguyen
(74) *Attorney, Agent, or Firm*—Turocy & Watson, LLP (57) ABSTRACT

A bus switch with level shifting may include a first terminal configured to receive and output a first power supply voltage higher than a reference voltage, a second terminal configured to receive and output a second power supply voltage higher than the first power supply voltage, an output control terminal to which a control signal for controlling a switching between an output permitted state and an output prohibited state is inputted, a first switching element provided between the first terminal and the second terminal and having a gate, a gate control circuit to which signals are inputted from the output control terminal and the second terminal, which supplies gate voltage to the gate of the first switching element, and which controls the first switching element to be conducting or to be non-conducting, and a second switching device provided between a power source of the second power supply voltage and the second terminal, and configured to switch between conducting and non-conducting in accordance with the electric potential of the second terminal.

20 Claims, 9 Drawing Sheets

BUS SWITCH WITH LEVEL SHIFTING

CROSS REFERENCE TO RELATED APPLICATION

This application is based upon and claims the benefit of priority from Japanese Patent Application No. 2006-192140, filed on Jul. 12, 2006, the entire contents of which are incorporated herein by reference.

BACKGROUND

There has been a demand for lowering a power supply voltage of a system LSI typified by a central processing unit (CPU) and a baseband IC for saving power consumption. On the other hand, lowering of a power supply voltage of a system used heretofore, or a system for processing analog signals has not been advanced in order to maintain compatibility with a conventional system or the like. As a result, when signals are transmitted between circuits of different power supply voltages, it is necessary to shift the level of the signals. As a level shifting device for different power supply voltages, there is a system for shifting a voltage from ±5 to ±3.3 V, for example. In addition, with reduction in a CPU drive voltage, systems for shifting a voltage from ±5 to ±2.5 V, and systems for shifting a voltage from ±3.3 to ±2.5 V are more widely used.

As a system for level shifting, there is a buffer-type level shifting circuit configured of a NAND circuit, a NOR circuit, an inverter, a level shifter circuit and the like. Such a circuit requires directional signals (DIR) for regulating directions of signals, and this increases the number of pins of a connecting terminal, and complicates the circuit. This results in increase in the chip size and price of a circuit.

On the other hand, there is a bus switch with level shifting using a switching effect produced by changing the gate voltage of a transistor, and such a bus switch can be fabricated with a simple circuit configuration. However, it is not easy to control the voltage of an output terminal with high accuracy. For example, variations in a gate threshold voltage results in variations in the voltage of the output terminal.

There is a conventional level shifting semiconductor device for switching the gate voltage of a MOS transistor serving as a switch between a first power supply voltage and a second power supply voltage in response to the voltage of an input terminal.

SUMMARY

Aspects of the invention relate to an improved bus switch with level shifting.

In one aspect of the present invention, a bus switch with level shifting may include a first terminal configured to receive and output a first power supply voltage higher than a reference voltage, a second terminal configured to receive and output a second power supply voltage higher than the first power supply voltage, an output control terminal to which a control signal for controlling a switching between an output permitted state and an output prohibited state is inputted, a first switching element provided between the first terminal and the second terminal and having a gate, a gate control circuit to which signals are inputted from the output control terminal and the second terminal, which supplies gate voltage to the gate of the first switching element, and which controls the first switching element to be conducting or to be non-conducting, and a second switching device provided between a power source of the second power supply voltage and the second terminal, and configured to switch between conducting and non-conducting in accordance with the electric potential of the second terminal, wherein the gate control circuit supplies the reference voltage to the gate of the first switching element, when the control signal corresponding to the output prohibited state is inputted to the output control terminal, the gate control circuit controls the first switching element to be conducting by supplying the gate of the first switching element with the second gate voltage higher than the reference voltage, when the control signal corresponding to the output permitted state is inputted to the output control terminal and the voltage of the second terminal is equal to the reference voltage, and the gate control circuit controls the first switching element to be non-conducting by supplying the gate of the first switching element with the lower one of the second gate voltage and the first power supply voltage, as a first gate voltage, when the control signal corresponding to the output permitted state is inputted to the output control terminal and the voltage of the second terminal is equal to the second power supply voltage.

In another aspect of the invention, a bus switch with level shifting, may include a first terminal configured to receive and output a first power supply voltage higher than a reference voltage, a second terminal configured to receive and output a second power supply voltage higher than the first power supply voltage, an output control terminal to which a control signal for controlling a switching between an output permitted state and an output prohibited state is inputted, a first switching element provided between the first terminal and the second terminal and having a gate, means for controlling the first switching element to be conducting or to be non-conducting, receiving signals from the output control terminal and the second terminal, and supplying a gate voltage to the gate of the first switching element, and a second switching element provided between a power source of the second power supply voltage and the second terminal, and configured to switch between conducting and non-conducting in accordance with the electric potential of the second terminal, wherein the means supplies the reference voltage to the gate of the first switching element when the control signal corresponding to the output prohibited state is inputted to the output control terminal, the means controls the first switching element to be conducting by supplying the gate of the first switching element with the second gate voltage higher than the reference voltage, when the control signal corresponding to the output permitted state is inputted to the output control terminal and the voltage of the second terminal is equal to the reference voltage, and the means controls the first switching element to be non-conducting by supplying the gate of the first switching element with the lower one of the second gate voltage and the first power supply voltage, as a first gate voltage, when the control signal corresponding to the output permitted state is inputted to the output control terminal and the voltage of the second terminal is equal to the second power supply voltage.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings.

FIGS. 2A and 2B are diagrams for explaining the bus switch with level shifting according to a first embodiment.

FIGS. 6A and 6B are diagrams for explaining a bus switch with level shifting according to a second embodiment.

DETAILED DESCRIPTION

Various connections between elements are hereinafter described. It is noted that these connections are illustrated in general and, unless specified otherwise, may be direct or indirect and that this specification is not intended to be limiting in this respect.

Embodiments of the present invention will be explained with reference to the drawings as next described, wherein like reference numerals designate identical or corresponding parts throughout the several views.

Hereinafter, embodiments of the present invention will be described by referring to the drawings.

Figure 1A:
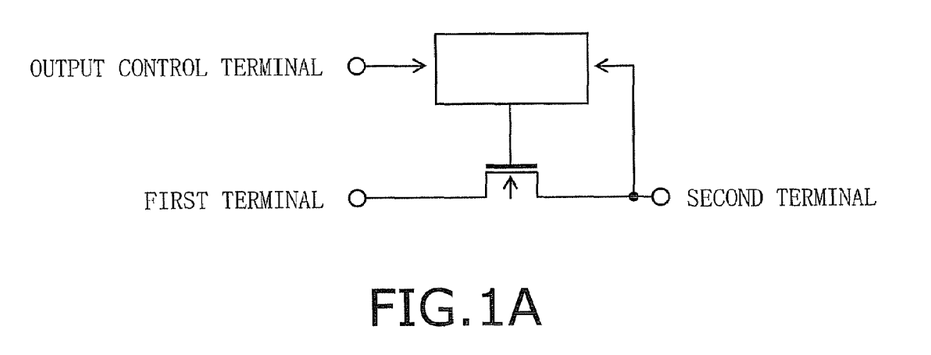
FIGS. 1A and 1B are diagrams for explaining effects of a bus switch with level shifting according to a first embodiment.
Figure 1B:
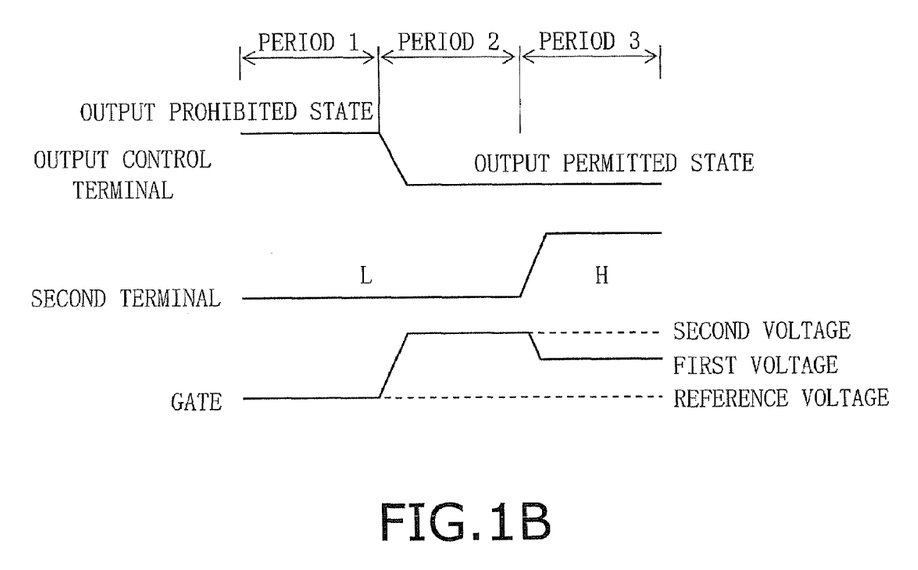

FIGS. 1A and 1B are diagrams for explaining a bus switch with level shifting. FIG. 1A shows a configuration of the bus switch, and FIG. 1B shows a waveform of operating voltage of each terminal.

A bus switch with level shifting of an embodiment may include: a first terminal connected to a logic circuit controlled by a first power supply voltage; a second terminal connected to the logic circuit controlled by a second power supply voltage; an output control terminal; a transistor that can be controlled by a gate, and a gate control circuit. The voltage states of the output control terminal and the second terminal are inputted to the gate control circuit, and one of gate voltages of 3 values is outputted corresponding to a combination of the states.

Here, assume that there is a relationship expressed by the following formulas (1) and (2) among these gate voltages.

Reference voltage<first power supply voltage ($VccA$)
    <second power supply voltage ($VccB$).    Formula (1)

Reference voltage<first gate voltage≦second gate
    voltage.    Formula (2)

Firstly, in an output prohibited state (at a period 1), the gate voltage is set to the reference voltage.

In an output permitted state, and when the second terminal voltage is the reference voltage (at a period 2), the gate voltage is set to the second gate voltage.

In the output permitted state, and when the second terminal is the second power supply voltage (at a period 3), the gate voltage is set to the first gate voltage. The gate voltage of the transistor is shifted in this way, whereby the transistor is switched between conducting (on) and non-conducting (off). Thereby, signals at shifted levels can be transmitted in both directions between the first terminal and the second terminal.

First Embodiment

Hereinafter, a more detailed description will be provided with reference to circuit diagrams.

Figure 2A:
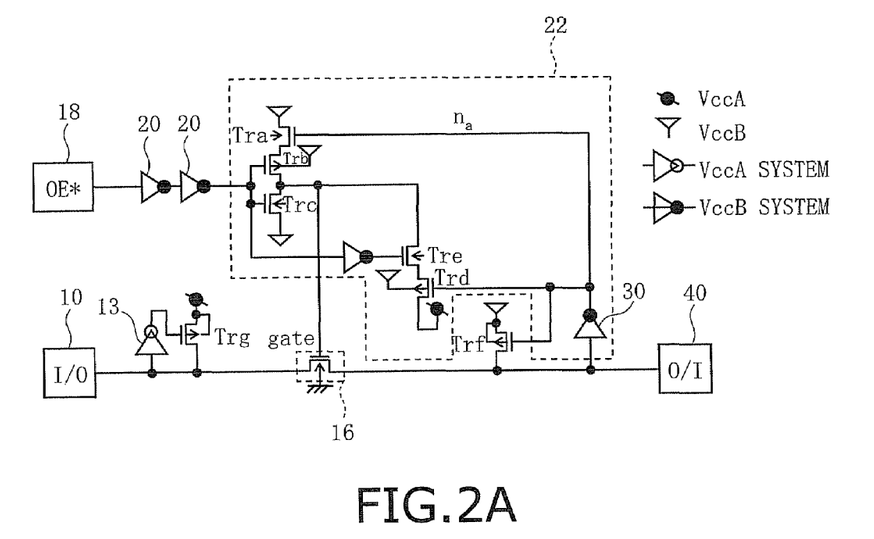
FIG. 2A is a circuit diagram thereof.
Figure 2B:
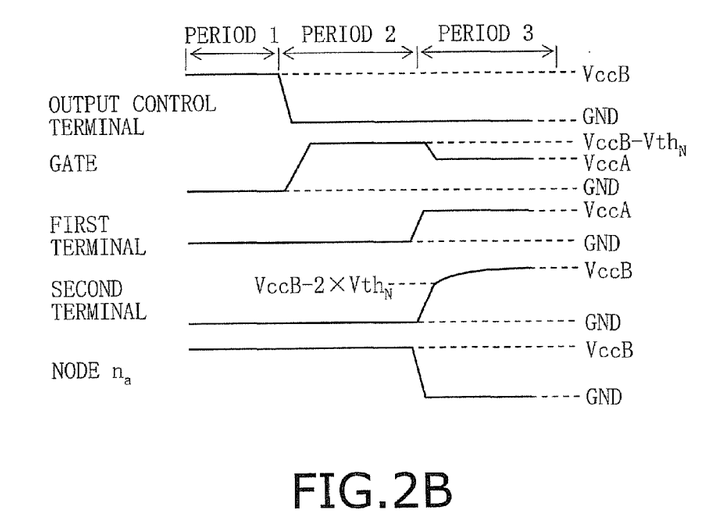
FIG. 2B shows waveforms of operating voltages.

FIGS. 2A and 2B are diagrams for explaining a bus switch with level shifting according to a first embodiment. FIG. 2A is a circuit diagram, and FIG. 2B shows a waveform of operating voltage of each terminal.

The bus switch with level shifting includes a first terminal 10, a second terminal 40, an output control terminal 18, a transistor 16 having a gate, and a gate control circuit 22 for controlling the gate of the transistor 16. The transistor 16 operates as a switch for turning on-off between the first terminal 10 and the second terminal 40 in response to control of the gate voltage. Assume that the reference voltage is zero and referred to as GND (grounded). Moreover, assume that a signal at a level between the first power supply voltage ($VccA$) and GND is inputted to the first terminal 10, and that a signal at a level between the second power supply voltage ($VccB$) and GND is inputted to the second terminal 40, where $VccA<VccB$. Incidentally, FIG. 2A shows the transistor 16 as an NMOS transistor, but the present invention is not limited to this. A PMOS transistor may also be used.

The output control terminal (OE*) 18 receives a signal to the gate control circuit 22. In addition, signals are inputted from the second terminal 40 and one terminal of the transistor 16 to an inverter 30 which is driven at a VccB system. The gate control circuit 22 outputs control signals to the gate of the transistor 16. In FIG. 2A, two inverters 20 serving as a buffer are inserted between the output control terminal 18 and the gate control circuit 22. The inverters 20 change a rise in a signal from slow to fast, for example.

An OE* signal inputted from the output control terminal 18 connected to a VccB system is inverted twice by the two inverters 20 which are driven at the VccB system, and which are connected in series. Then, the OE* signal is inputted to the gate control circuit 22. Between the first terminal 10 and the transistor 16, the inverter 13 and the PMOS transistor (Trg) are provided. The output terminal of the inverter 13 driven by the VccA system is connected to a gate of the PMOS transistor (Trg) driven by the VccA system.

Next, an operation of the bus switch will be descried with reference to the waveforms of operating voltages shown in FIG. 2B.

First, at a period 1, the bus switch is in the output prohibited state, and the voltage of the OE* signal is set to VccB. The gate voltage of the transistor 16 is set to the reference voltage, that is, GND, so that the transistor 16 is turned off. The symbol * indicates that a signal is inverted.

The period 2 shows a state in which the OE* signal is shifted from an H level (VccB) to an L level (=GND). At this period, when the voltage of the second terminal 40 is at the L level (=GND), the output of the inverter 30 which is connected to the second terminal 40, and which is driven at the VccB system is inverted and set to the H level (=VccB), so that the voltage of a node $n_a$ is VccB. As a result, the NMOS transistor (Tra) and the PMOS transistor (Trb) are both turned on. Thus, the gate voltage is set to the second gate voltage ($VccB-Vth_N$) that is lower than the second power supply voltage by a gate threshold value $Vth_N$ of an N channel of the NMOS transistor (Tra), and the transistor 16 is turned on.

The period 3 shows a state in which the voltage of the first terminal 10 is shifted to the H level (VccA). At the period 2, the transistor 16 is turned on. Upon turning-on, a signal inputted to the first terminal 10 starts to be transmitted to the second terminal 40, and the voltage of the second terminal 40 increases from the L level (=GND) toward (VccB−2×Vth$_N$). The voltage reduced from VccB by the threshold value Vth$_N$ of Tra is supplied to the gate of the transistor 16, and the voltage of the second terminal 40 increases toward (VccB−2×Vth$_N$) so that the voltage difference between the gate and the second terminal would be Vth$_N$. When this increase raises the voltage of the second terminal 40 up to a circuit threshold value of the inverter 30, the inverter 30 is inverted and its output level becomes the L level (=GND). In other words, the voltage of the node n$_a$ is shifted to the L level (=GND).

As a result, the NMOS transistor (Tra) is turned off, and the voltage from the VccB system is shut off. Instead, a transistor (Trd) is turned on, and a transistor (Tre) is kept on. Thus, the lower voltage is selected from VccA and (VccB−Vth$_N$), and is inputted to the gate of the transistor 16. When VccB>(VccA−Vth$_N$), the power supply voltage VccA is supplied to the gate of the transistor 16 through Trd and Tre. When VccB≦(VccA−Vth$_N$), the power supply voltage (VccB−Vth$_N$) is supplied to the gate of the transistor 16, where (VccB−Vth$_N$) is obtained by subtracting the threshold value Vth$_N$ of Tre from VccB supplied to the gate of Tre. FIG. 2B shows a case where VccA is selected.

At this time, since the voltage of the first terminal 10 is shifted from GND to VccA, the source-gate voltage Vgs becomes 0 V or minus, whereby the transistor 16 is turned off. As a result, the second terminal 40 is undisturbedly charged by a transistor (Trf), so that the voltage of the second terminal 40 increases to VccB and reaches saturation. Thereby, the output voltage can be controlled with high accuracy.

After the period 3, in a case where the voltage of the first terminal 10 is shifted to the L level (=GND), the source-gate voltage Vgs of the transistor 16 is VccA, and thereby the transistor 16 is turned on, which causes the voltage of the second terminal 40 to become the L level (=GND).

Here, a description will be provided by using specific examples of numeric values.

Assume that VccA=3.3 V, VccB=5 V and Vth$_N$=0.8 V. In this case, the gate voltage shown in FIG. 2B is set to (VccB−Vth$_N$)=4.2 V at the period 2, and VccA=3.3V at the period 3. The voltage of the second terminal 40 may increase from 0 V, i.e., GND, to (VccB−2×Vth$_N$)=3.4 V at the period 3, but since VccA is 3.3 V, the second terminal 40 is charged until its voltage reaches 3.3 V. When the inverter 30 is inverted, and when the gate voltage is decreased to 3.3 V, the transistor 16 is turned off. As a result, the voltage of the second terminal 40 is increased to 5 V by being charged from the transistor (Trf).

Hereinafter, a description will be given for signal transmission from the second terminal 40 to the first terminal 10. When the OE* signal is at the L level (=GND), and when the second terminal 40 is at the L level (=GND), the gate voltage of the transistor 16 is (VccB−Vth$_N$), so that the transistor 16 is on. When the voltage of the second terminal 40 is shifted from the L level (=GND) to the H level (=VccB), the voltage (VccB−2×Vth$_N$) is transmitted to the first terminal 10. When the voltage of the first terminal 10 is increased to the circuit threshold value of the inverter 13, the inverter 13 is inverted. Thus, the PMOS transistor (Trg) is turned on, and charging of the first terminal 10 starts and increases the voltage of the first terminal 10 to VccA.

Moreover, since the voltage of the second terminal 40 is at the level VccB, the gate voltage is shifted to the lower one of the voltage levels of VccA and (VccB−Vth$_N$). Consequently, the voltage of the first terminal 10 becomes VccA, and the gate-source voltage Vgs becomes 0 V or minus, whereby the transistor 16 is turned off.

At the period 3, in a case where the voltage (VccB−2×Vth$_N$), which appears in a transition state before the transistor 16 is turned off, is larger than VccA, a through current may flow to a semiconductor device connected to the outside of the first terminal 10.

However, when the inverter 13 and the PMOS transistor (Trg) are provided, the through current can be caused to flow to a parasitic diode of the transistor (Trg). To be more precise, the input terminal of the inverter 13 is connected to the first terminal 10. The transistor (Trg) has the gate connected to the output terminal of the inverter 13, is driven at the VccA system, and is connected to the first terminal 10. In this way, a through current is prevented from flowing to an external circuit. Incidentally, when an external circuit is connected to the power supply voltage through a resister outside the first terminal 10 or the second terminal 40, the inverter 13, the transistor (Trg) and the transistor (Trf) may be omitted.

According to the first embodiment, the transistor 16 can be turned off, and the input and output terminals can be charged by the transistor Trf or Trg in the output permitted state at the period 3. In this way, the voltages of the input and output terminals can be adjusted to power supply voltages satisfying system requirements.

On the other hand, there is a comparative example of a bus switch with level shifting in which bus hold circuits provided to input and output terminals, and in which the gate is set to be a second power supply voltage or GND. In this comparative example, in case (second power supply voltage−first power supply voltage)>(threshold value of a transistor), a short circuit is caused between a first power source and a second power source, since the two bus hold circuits are connected to each other through the transistor serving as a switch. In contrast, in the first embodiment, the turning-off of the transistor 16 at the period 3 prevents a short circuit between the power sources.

The signal level can be shifted while controlling the output voltage with higher accuracy in the first embodiment. In addition, there may be not necessary for a directional signal terminal (DIR) or a MOS transistor having a threshold value of 0. Thus, it is possible to obtain a bus switch with level shifting with a simple circuit configuration.

First Modification of the First Embodiment

Figure 3:
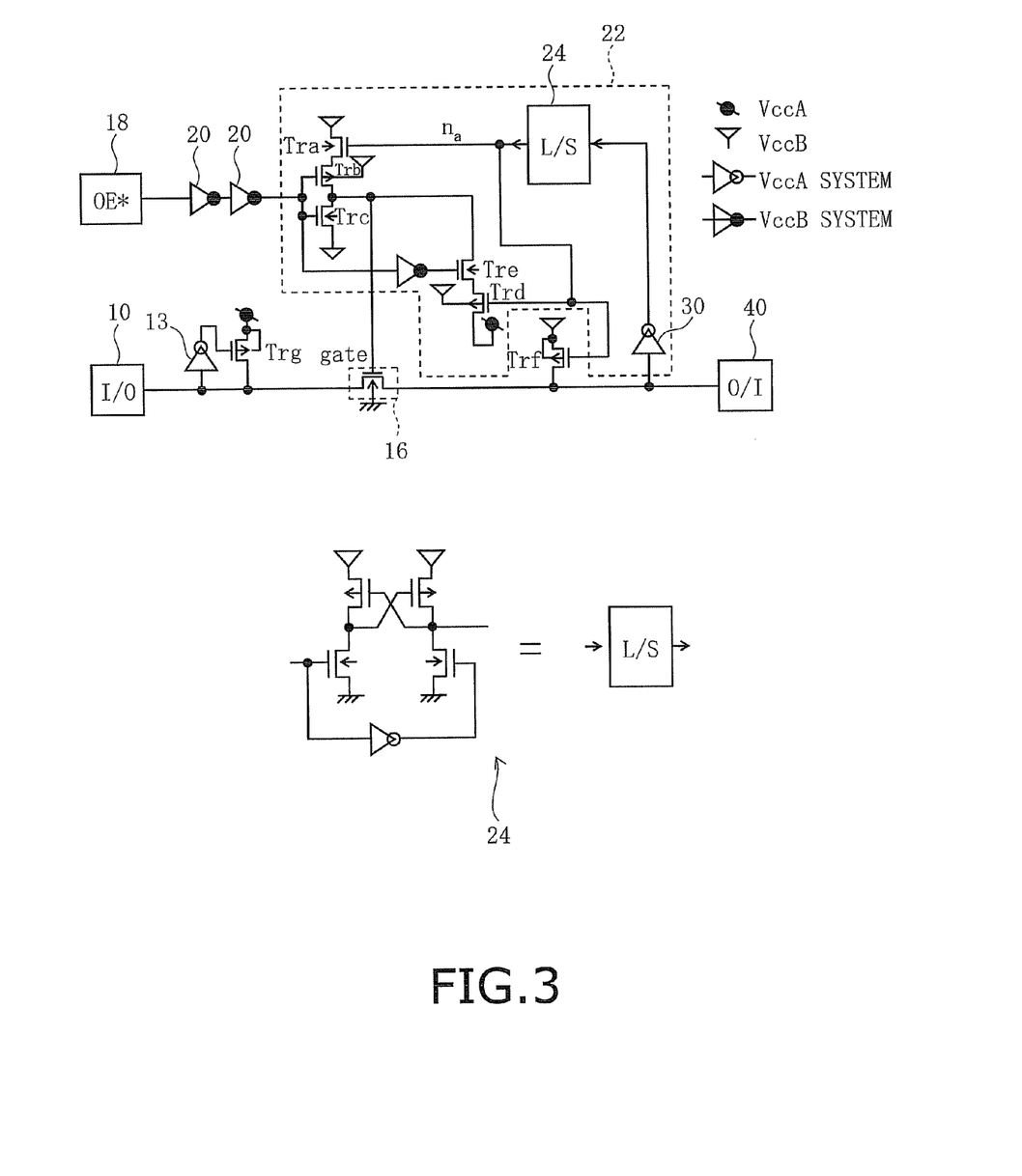
FIG. 3 is a schematic diagram showing a first modification of the first embodiment.

FIG. 3 shows a circuit diagram of a first modification of the first embodiment. Incidentally, in FIG. 3, the same reference numerals are given to the same components as in FIG. 2A, and detailed explanations for them will be omitted here.

In the first embodiment, a problem may occur when the voltage difference between VccB and VccA is large. More specifically, there is a case where the circuit threshold value of the inverter 30 driven at VccB is so high that the inverter 30 cannot be inverted even when the voltage of the first terminal 10 is shifted from the L level to the signal level VccA. When the VccA system is employed for an inverter 30, the inverter 30 can be inverted more surely even when a low voltage is transmitted from a first terminal 10. Consequently, the transistor 16 can be surely turned off, which allows the voltage of a second terminal 40 to increase to VccB with high accuracy.

Note that, in this case, a level shifter circuit (L/S) 24 is inserted between the output terminal of the inverter 30 and the node n$_a$, in order to connect the inverter 30 to an NMOS transistor (Tra) driven at VccB. The level shifter circuit 24 is composed of two pairs of a PMOS transistor and an NMOS transistor connected in serial, and an inverter of the VccA system. The gate of the PMOS transistor of each of the pairs of the PMOS transistor and the NMOS transistor connected in serial is connected to one of connoting points of the other pair. The gate of the NMOS transistor of each of the pairs is connected to the inverter. This level shifter circuit 24 shifts the output of the inverter 30 from the level of the VccA system to the level of the VccB system. This configuration causes the inverter 30 to be surely inverted.

Second Modification of the First Embodiment

Figure 4:
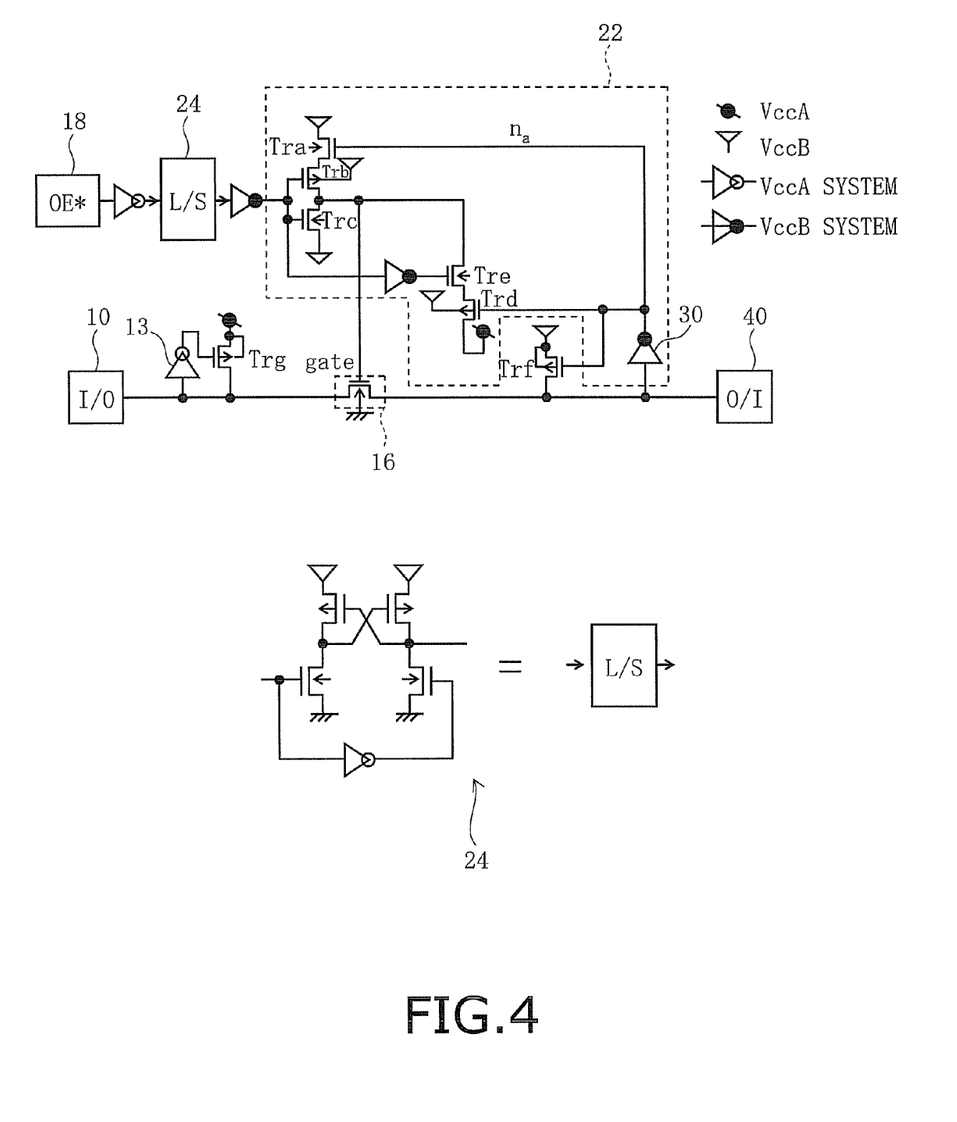
FIG. 4 is a schematic diagram showing a second modification of the first embodiment.

FIG. 4 shows a circuit diagram of a second modification of the first embodiment. Incidentally, the same reference numerals are also given to the same components as in FIG. 2A and FIG. 3, and detailed explanations for them will be omitted here.

In this modification, an OE* signal of the VccA system is inputted to an output control terminal 18. A level shifter circuit 24 is inserted between an inverter operating at the VccA system and connected to the output control terminal 18, and an inverter operating at the VccB system and connected to one of input terminals of a gate control circuit 22.

The level shifter circuit 24 is inserted as shown in FIG. 4, because there is a case where The OE* signal of the VccA system fails in turning off a transistor (Trb) completely. This configuration allows even a lower OE* signal of the VccA system to turn off the transistor Trb surely. It is generally convenient that signals for controlling the system are generated by a CPU. In this case, the second modification is preferable because OE* signals are often generated at a low power supply voltage from the VccA system having a low power supply voltage.

Third Modification of the First Embodiment

Figure 5:
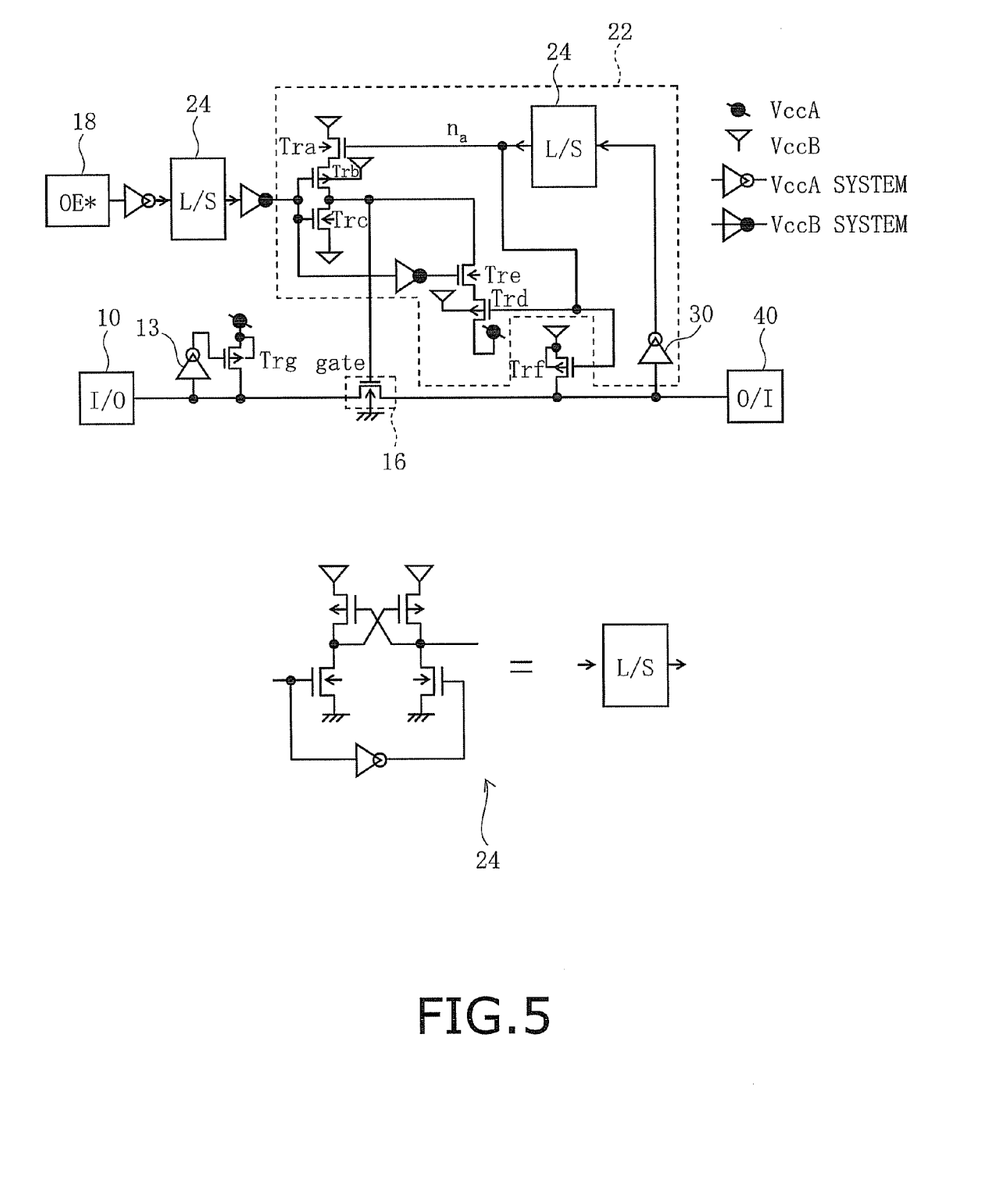
FIG. 5 is a schematic diagram showing a third modification of the first embodiment.

FIG. 5 shows a circuit diagram of a third modification of the first embodiment. Incidentally, also in FIG. 5, the same reference numerals are given to the same components as in FIGS. 2A to 4, and detailed explanations for them will be omitted here.

The third modification has a configuration including both of the first modification shown in FIG. 3 and the second modification shown in FIG. 4. More precisely, level shifter circuits 24 are inserted between an inverter 30 and a transistor (Tra) and between an output control terminal 18 and a gate control circuit 22. This configuration allows the inverter 30 to be surely inverted and a PMOS transistor (Trb) to be surely switched, even when the voltage difference between VccA and VccB is large, and even when an OE* signal is of the VccA system.

Second Embodiment

Figure 6A:
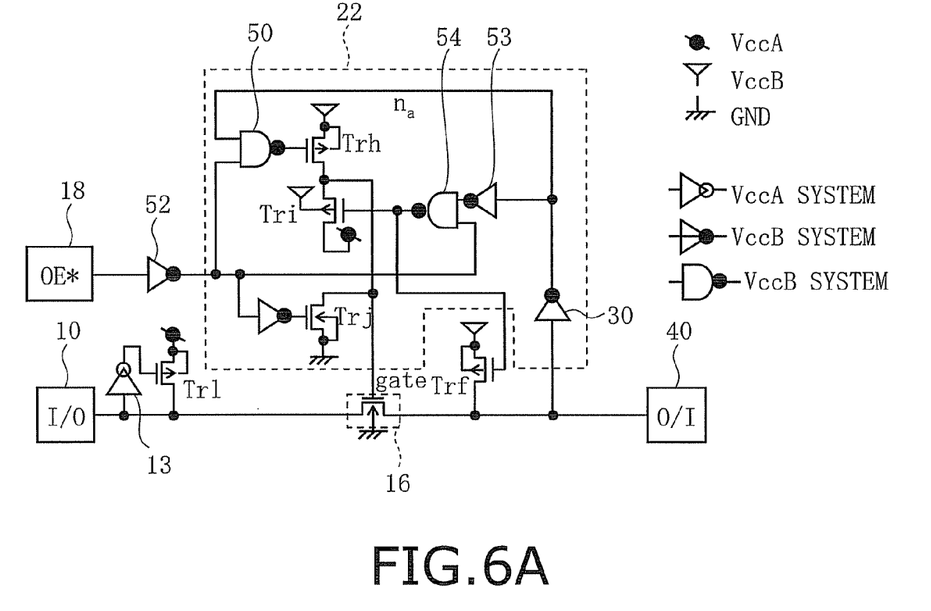
FIG. 6A is a circuit diagram thereof.
Figure 6B:
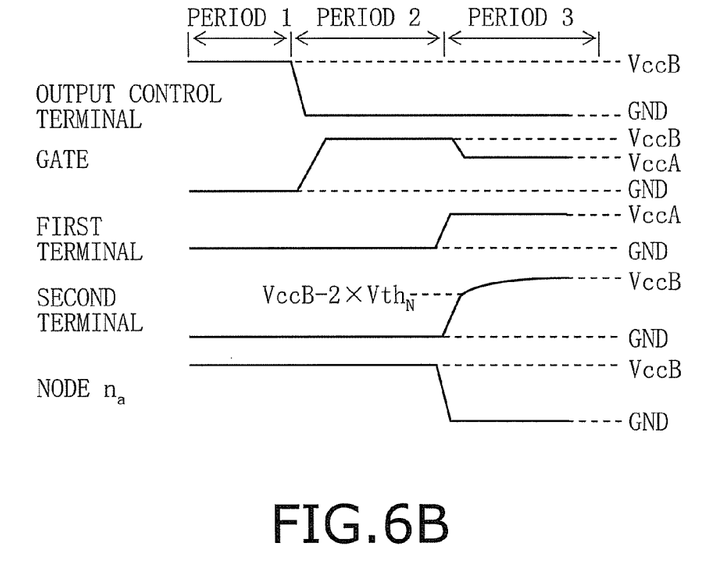
FIG. 6B shows waveforms of operating voltages.

FIGS. 6A and 6B are diagrams for explaining a bus switch with level shifting of a second embodiment of the present invention. FIG. 6A is a circuit diagram and FIG. 6B shows waveforms of operating voltages. Incidentally, the same reference numerals are given to the same components as in FIGS. 2A and 2B, and detailed explanations for them will be omitted here.

In the second embodiment, an output terminal of an inverter 30 connected to a second terminal 40 is not connected to an NMOS transistor but to one of input terminals of a NAND circuit 50 of the VccB system. The other input terminal of the NAND circuit 50 is connected to an inverter 52 and the like of the VccB system connected to an output control terminal 18. In addition, at a period 1, a transistor (Trj) is turned on when an OE* signal is at the H level (=VccB), and a transistor 16 is turned off since its gate voltage becomes GND.

The period 2, which is in an output permitted state, shows a state in which the OE* signal is changed from the H level (=VccB) to the L level (=GND). At this period, when the voltage of the second terminal 40 is at the L level (=GND), an output of an inverter 30 connected to the second terminal 40 and driven at the VccB system is inverted and set to the H level (=VccB), whereby the voltage of a node $n_a$ is set to VccB. Since the other input of the NAND circuit 50 is at the H level (=VccB), the output of the NAND circuit 50 becomes at the L level (=GND), a transistor (Trh) is turned on, and the gate voltage of the transistor 16 becomes VccB, whereby the transistor 16 is turned on.

The period 3 shows a state in which the first terminal 10 is shifted to the H level (=VccA). At the period 2, since the transistor 16 is on, a signal inputted to the first terminal 10 starts to be transmitted to the second terminal 40, and the voltage of the second terminal 40 is shifted from the L level (=GND) to (VccB−$Vth_N$). Accordingly, when the voltage of the second terminal 40 is increased to a circuit threshold value of the inverter 30, the inverter 30 is inverted and its output is shifted to the L level (=GND). In other words, the node $n_a$ is shifted to the L level (=GND).

As a result, the output of the NAND circuit 50 becomes at the H level (=VccB), and a transistor (Trh) is turned off. On the other hand, since both the H level (=VccB) from an inverter 53 and the H level (=VccB) from the inverter 52 are inputted to a NAND circuit 54, the output of the NAND circuit 54 becomes at the L level (=GND), and a transistor (Tri) is turned on, whereby the gate voltage of the transistor 16 is changed to VccA.

At the period 3, the voltage of the first terminal 10 is VccA, and the source-gate voltage Vgs becomes 0 V, whereby the transistor 16 is turned off. Consequently, the second terminal 40 is undisturbedly charged by a transistor (Trk), and the voltage thereof increases to VccB and reaches saturation. Thus, the output voltage can be controlled with high accuracy.

The second embodiment does not employ the NMOS transistor (Tra) included in the first embodiment. For this reason, it is possible to input signals to the gate of the transistor 16 without lowering the voltage by the threshold value voltage $Vth_N$ in this transistor (Tra). This results in an improvement of efficiency in voltage transmission to the second terminal 40. In terms of the waveforms of operating voltages in FIG. 6B, the second voltage to the gate is improved to be VccB. Consequently, when the voltage of the first terminal 10 is changed to VccA, the voltage of the second terminal 40 becomes (VccB−$Vth_N$), and the gate voltage at the period 3 becomes VccA. Since the higher voltage (VccB−$Vth_N$) is transmitted to the second terminal 40, it is possible to reduce the time for charging the second terminal 40 to reach VccB by the transistor (Trk) after the inverter 30 is inverted. Note that the second embodiment also has the same effect as in the first embodiment.

Here, a description will be provided by using specific examples of numeric values. Assume that VccA=3.3 V, VccB=5 V and $Vth_N$=0.8 V. In this case, the gate voltage shown in FIG. 6B becomes 5 V at the period 2, and 3.3V at the period 3. The voltage of the second terminal 40 may increase from 0 V, i.e., GND, to (VccB−$Vth_N$)=4.2 V at the period 3, but since VccA is 3.3 V, the second terminal 40 is charged until its voltage reaches 3.3 V. When the inverter 30 is inverted, and when the gate voltage decreases to 3.3 V, the transistor 16 is turned off. As a result, the voltage of the second terminal 40 is undisturbedly increased to 5 V.

First Modification of the Second Embodiment

Figure 7:
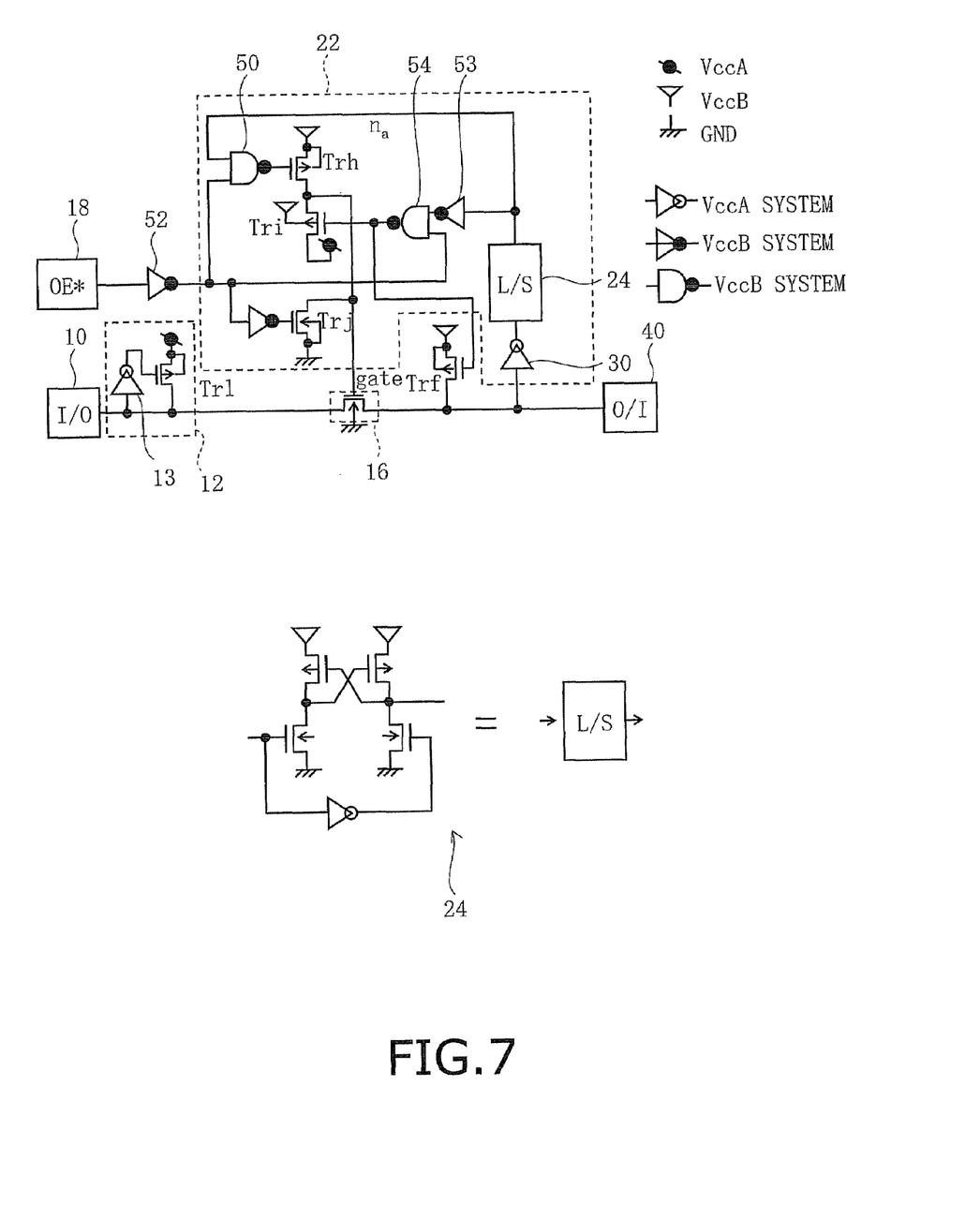
FIG. 7 is a schematic diagram showing a first modification of the second embodiment.

FIG. 7 shows a diagram of a first modification of the second embodiment. Incidentally, in FIGS. 7 to 9, the same reference numerals are given to the same components as in FIG. 6A, and detailed explanations for them will be omitted.

An inverter 30 operates at the VccA system, and a level shifter circuit 24 is inserted between an output terminal of the inverter 30 and an input terminal of a NAND circuit 50. This level shifter circuit 24 causes the inverter 30 to be more surely inverted even when a low voltage is transmitted from a first terminal 10. As a result, the transistor 16 is surely turned off, which allows the voltage of a second terminal 40 to be increased to VccB with high accuracy.

Second Modification of the Second Embodiment

Figure 8:
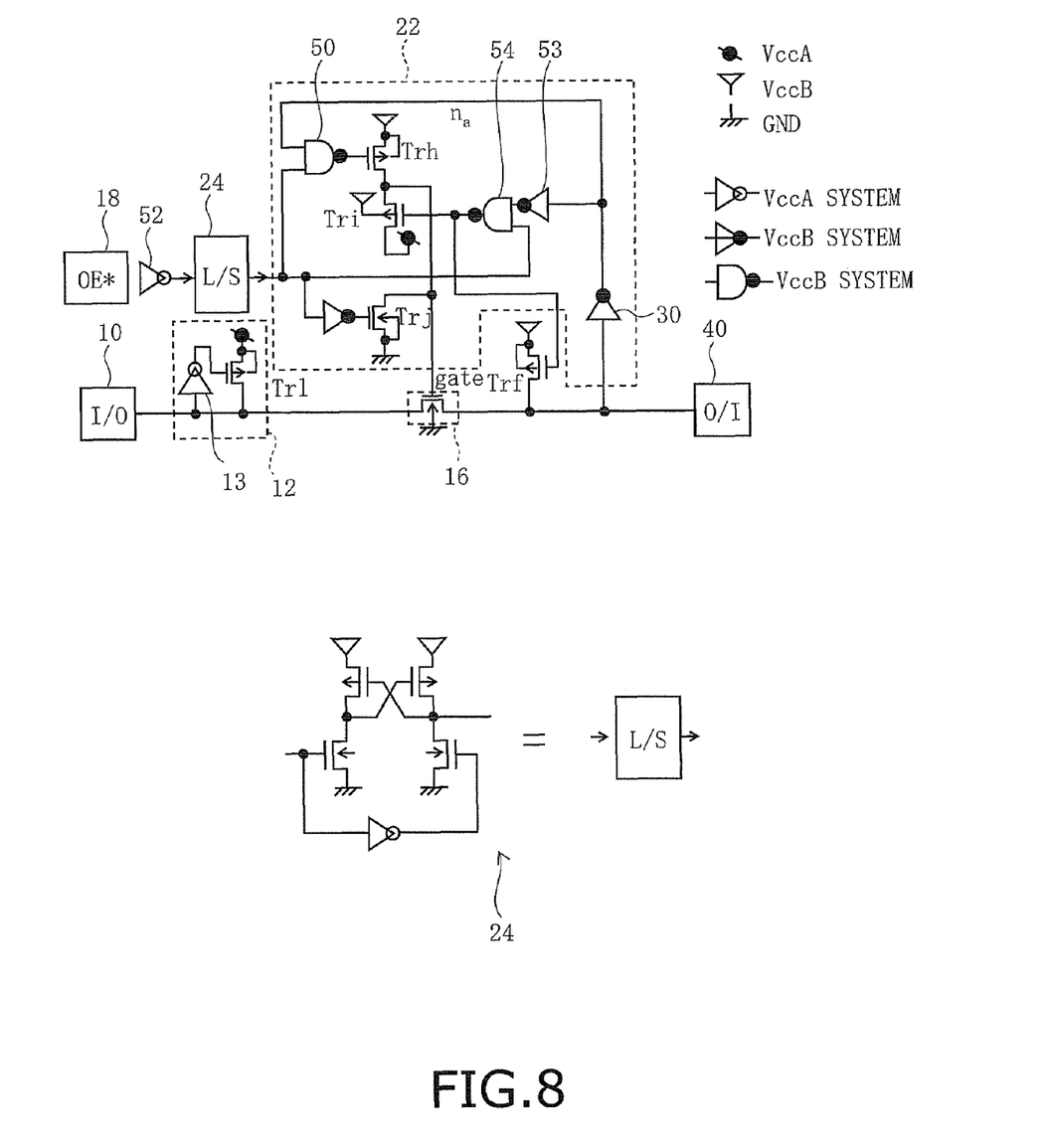
FIG. 8 is a schematic diagram showing a second modification of the second embodiment.

FIG. 8 is a schematic diagram showing a second modification of the second embodiment.

An output control terminal 18 is connected to a VccA system, and is connected to a level shifter circuit 24 through an inverter 52 driven at the VccA system. Consequently, an output control signal from a CPU having a low power supply voltage can be shifted to a higher level and be inputted to a gate control circuit 22.

Third Modification of the Second Embodiment

Figure 9:
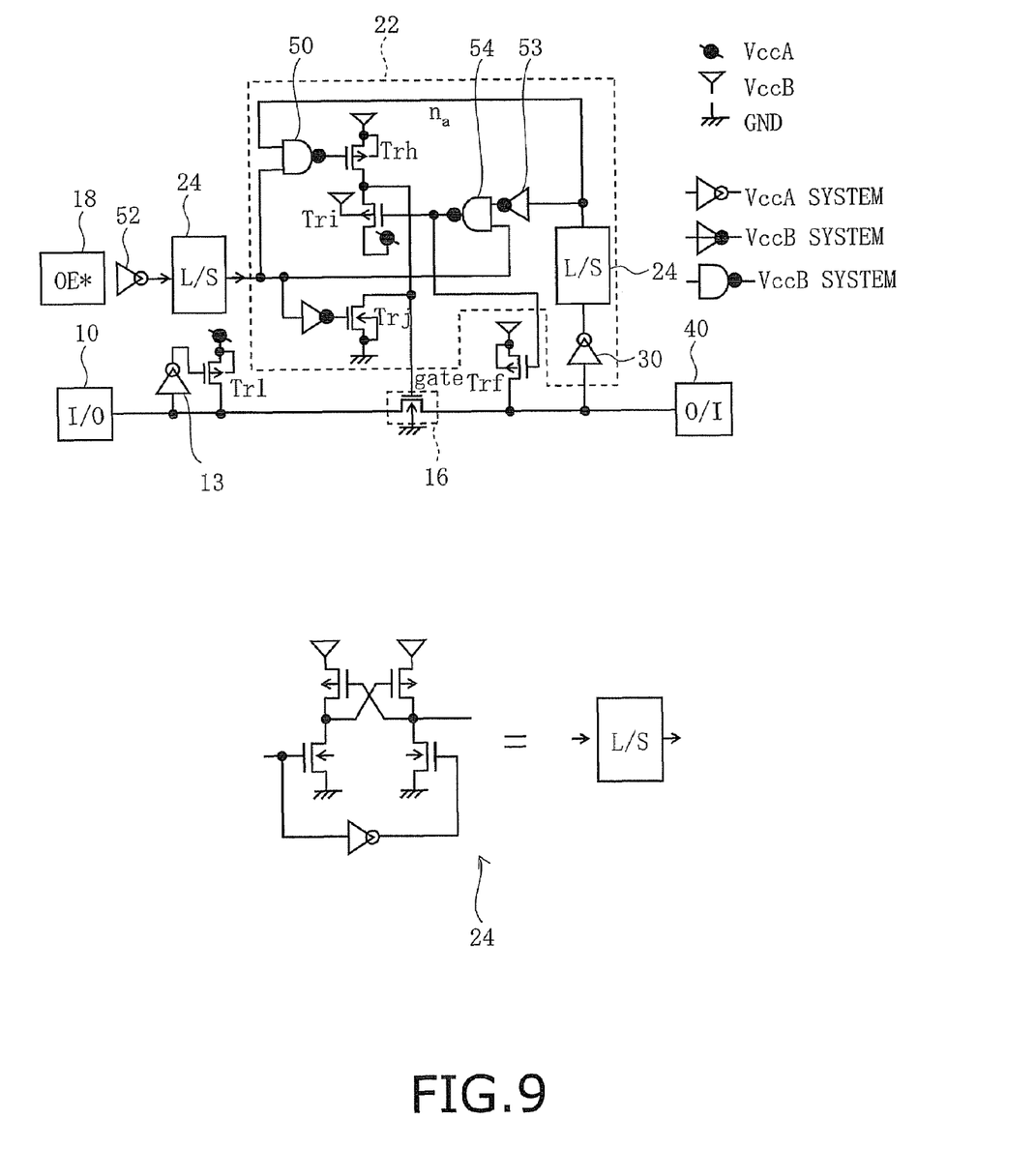
FIG. 9 is a schematic diagram showing a third modification of the second embodiment.

FIG. 9 is a schematic diagram showing a third modification of the second embodiment.

An output control terminal 18 is connected to a VccA system, and is connected to a level shifter circuit 24 through an inverter 52 driven at the VccA system. An inverter 30 is of the VccA system, and a level shifter circuit 24 is inserted between an output terminal of the inverter 30 and an input terminal of a NAND circuit 50. As a result, an output control signal from a CPU having a low power supply voltage can be shifted to a higher level and be inputted to a gate control circuit 22. Moreover, the inverter 30 can be more surely inverted even when a low voltage is transmitted from a first terminal 10. In this way, this configuration allows the voltage of a second terminal 40 to be increased to VccB with high accuracy.

Embodiments of the invention have been described with reference to the examples. However, the invention is not limited thereto.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A bus switch with level shifting, comprising:
    a first terminal configured to receive and output a first signal having an amplitude of a first power supply voltage higher than a reference voltage;
    a second terminal configured to receive and output a second signal having an amplitude of second power supply voltage higher than the first power supply voltage;
    an output control terminal to which a control signal for controlling a switching between an output permitted state and an output prohibited state is inputted;
    a first switching element provided between the first terminal and the second terminal and having a gate;
    a gate control circuit to which signals are inputted from the output control terminal and the second terminal, and which controls the first switching element to be conducting or to be non-conducting; and
    a second switching device provided between a power source of the second power supply voltage and the second terminal, and configured to switch between conducting and non-conducting in accordance with the electric potential of the second terminal,
    wherein the gate control circuit supplies the reference voltage to the gate of the first switching element, when the control signal corresponding to the output prohibited state is inputted to the output control terminal,
    the gate control circuit controls the first switching element to be conducting by supplying the gate of the first switching element with a second gate voltage higher than the reference voltage, when the control signal corresponding to the output permitted state is inputted to the output control terminal and the voltage of the second terminal is equal to the reference voltage, and
    the gate control circuit controls the first switching element to be non-conducting by supplying the gate of the first switching element with the lower one of the second gate voltage and the first power supply voltage, as a first gate voltage, when the control signal corresponding to the output permitted state is inputted to the output control terminal and the voltage of the second terminal is equal to the second power supply voltage.

2. The bus switch with level shifting according to claim 1, wherein the first gate voltage is the first power supply voltage.

3. The bus switch with level shifting according to claim 1, wherein the second gate voltage is the second power supply voltage.

4. The bus switch with level shifting according to claim 2, wherein the second gate voltage is the second power supply voltage.

5. The bus switch with level shifting according to claim 1, further comprising:
    an inverter having an input terminal connected to the first terminal; and
    a third switching element provided between a power source of the first power supply voltage and the first terminal, and configured to switch between conducting and non-conducting according to the electric potential of the first terminal.

6. The bus switch with level shifting according to claim 1, wherein a level shifter circuit is provided between the output control terminal and the gate control circuit, the level shifter circuit having an input terminal connected to an output terminal of an inverter driven by the first power supply voltage.

7. The bus switch with level shifting according to claim 1, wherein a level shifter circuit is provided in the gate control circuit, the level shifter circuit having an input terminal connected to an output terminal of an inverter driven by the first power supply voltage.

8. The bus switch with level shifting according to claim 4, further comprising:
    an inverter having an input terminal connected to the first terminal; and
    a third switching element provided between a power source of the first power supply voltage and the first terminal, and configured to switch between conducting and non-conducting according to the electric potential of the first terminal.

9. The bus switch with level shifting according to claim 8, wherein a level shifter circuit is provided between the output control terminal and the gate control circuit, the level shifter circuit having an input terminal connected to an output terminal of an inverter driven by the first power supply voltage.

10. The bus switch with level shifting according to claim 8, wherein a level shifter circuit is provided in the gate control circuit, the level shifter circuit having an input terminal connected to an output terminal of an inverter driven by the first power supply voltage.

11. A bus switch with level shifting, comprising:
   a first terminal configured to receive and output a first signal having an amplitude of a first power supply voltage higher than a reference voltage;
   a second terminal configured to receive and output a second signal having an amplitude of a second power supply voltage higher than the first power supply voltage;
   an output control terminal to which a control signal for controlling a switching between an output permitted state and an output prohibited state is inputted;
   a first switching element provided between the first terminal and the second terminal and having a gate;
   means for controlling the first switching element to be conducting or to be non-conducting, receiving signals from the output control terminal and the second terminal; and
   a second switching element provided between a power source of the second power supply voltage and the second terminal, and configured to switch between conducting and non-conducting in accordance with the electric potential of the second terminal,
   wherein the means for controlling supplies the reference voltage to the gate of the first switching element when the control signal corresponding to the output prohibited state is inputted to the output control terminal,
   the means for controlling controls the first switching element to be conducting by supplying the gate of the first switching element with the second gate voltage higher than the reference voltage, when the control signal corresponding to the output permitted state is inputted to the output control terminal and the voltage of the second terminal is equal to the reference voltage, and
   the means for controlling controls the first switching element to be non-conducting by supplying the gate of the first switching element with the lower one of a second gate voltage and the first power supply voltage, as a first gate voltage, when the control signal corresponding to the output permitted state is inputted to the output control terminal and the voltage of the second terminal is equal to the second power supply voltage.

12. The bus switch with level shifting according to claim 11, wherein the first gate voltage is the first power supply voltage.

13. The bus switch with level shifting according to claim 11, wherein the second gate voltage is the second power supply voltage.

14. The bus switch with level shifting according to claim 12, wherein the second gate voltage is the second power supply voltage.

15. The bus switch with level shifting according to claim 11, further comprising:
   an inverter having an input terminal connected to the first terminal; and
   a third switching element provided between a power source of the first power supply voltage and the first terminal, and configured to switch between conducting and non-conducting according to the electric potential of the first terminal.

16. The bus switch with level shifting according to claim 11, wherein a level shifter circuit is connected to the output control terminal, the level shifter circuit having an input terminal connected to an output terminal of an inverter driven by the first power supply voltage.

17. The bus switch with level shifting according to claim 11, wherein a level shifter circuit is provided in the means, the level shifter circuit having an input terminal connected to an output terminal of an inverter driven by the first power supply voltage.

18. The bus switch with level shifting according to claim 14, further comprising:
   an inverter having an input terminal connected to the first terminal; and
   a third switching element provided between a power source of the first power supply voltage and the first terminal, and configured to switch between conducting and non-conducting according to the electric potential of the first terminal.

19. The bus switch with level shifting according to claim 18, wherein a level shifter circuit is provided between the output control terminal and the means, the level shifter circuit having an input terminal connected to an output terminal of an inverter driven by the first power supply voltage.

20. The bus switch with level shifting according to claim 18, wherein a level shifter circuit is provided in the means, the level shifter circuit having an input terminal connected to an output terminal of an inverter driven by the first power supply voltage.

* * * * *